United States Patent
Lai et al.

(10) Patent No.: US 6,382,846 B1
(45) Date of Patent: May 7, 2002

(54) INTERMEDIATE INSTRUCTION EXECUTION PROCESSOR WHICH RESOLVES SYMBOLIC REFERENCES WITHOUT MODIFYING INTERMEDIATE INSTRUCTION CODE

(75) Inventors: George Shiang-Jyh Lai, Taipei; Ruey-Liang Ma, Lo-Tung; Dze-chaung Wang, Nantou; Shi-Sheng Shang, Kaosiung; Kun-Cheng Wu, Hsinchu, all of (TW)

(73) Assignee: Industial Technology Research Institute, Hsinchu (TW)

( * ) Notice: Subject to any disclaimer, the term of this patent is extended or adjusted under 35 U.S.C. 154(b) by 0 days.

(21) Appl. No.: 09/004,870

(22) Filed: Jan. 9, 1998

(51) Int. Cl.$^7$ ................................................. G06F 9/45
(52) U.S. Cl. ........................ 395/385; 395/568; 395/705
(58) Field of Search ................................. 395/500, 701, 395/702, 705, 707, 384, 385, 386, 561, 567, 568

(56) References Cited

U.S. PATENT DOCUMENTS

| | | | | |
|---|---|---|---|---|
| 5,303,392 A | * | 4/1994 | Carney et al. | 395/705 |
| 5,367,685 A | | 11/1994 | Gosling | 395/707 |
| 5,553,286 A | * | 9/1996 | Lee | 395/705 |
| 5,724,590 A | * | 3/1998 | Goettelmann et al. | 395/707 |
| 5,778,231 A | * | 7/1998 | Van Hoff et al. | 395/705 |

OTHER PUBLICATIONS

M. Hamilton, *Java and the Shift to Net Centric Computing*, 1996 IEEE Computer J., Aug. 1996, pp. 31–39.

* cited by examiner

*Primary Examiner*—Viet D. Vu
(74) *Attorney, Agent, or Firm*—Proskauer Rose LLP (57) ABSTRACT

A processor is provided with a decoder, a memory connected to the decoder and an execution stage connected to the decoder. The decoder receives each instruction. Each time the decoder receives an instruction, if the instruction contains a symbolic reference, the decoder determines whether or not the symbolic reference has been resolved into a numeric operand. If the symbolic reference has been resolved into a numeric operand, the memory retrieves, from a numeric reference table, a numeric operand to which the symbolic reference has been resolved. The execution stage then executes the instruction on the retrieved numeric operand in place of the symbolic reference. If the symbolic reference has not been resolved into a numeric operand, then the execution stage searches a data object, which relates each symbolic reference to a memory slot in which a corresponding numeric operand is stored, for a numeric reference relating the symbolic reference to a corresponding numeric operand. The memory then retrieves the numeric operand, that corresponds to the unresolved symbolic reference, from the memory slot indicated by the numeric reference of the data object. The memory stores the retrieved numeric operand in the numeric reference table maintained therein. The execution stage executes the instruction on the retrieved numeric operand in place of the symbolic reference of the instruction and indicates to the decoder that the symbolic reference is resolved. "Resolved indications," which each indicates whether or not a specific, respective symbolic reference is resolved, can be stored in a numeric reference buffer and accessed using the instruction fetch address as an index. The numeric reference table can also be stored in the numeric reference buffer and accessed (indexed) the same way.

26 Claims, 5 Drawing Sheets

INTERMEDIATE INSTRUCTION EXECUTION PROCESSOR WHICH RESOLVES SYMBOLIC REFERENCES WITHOUT MODIFYING INTERMEDIATE INSTRUCTION CODE

RELATED APPLICATION

This application is related to the following patents and patent applications:

(1) U.S. patent application Ser. No. 08/805,660, entitled "Apparatus and Method for Parallel Decoding of Variable-Length Instructions in a Superscalar Pipelined Data Processing System," filed on Feb. 27, 1997 for Shi-Sheng SHANG and Dze-Chaung WANG, (2) U.S. patent application Ser. No. 08/834,312, entitled "A Reorder Buffer Architecture for Accessing Partial Word Operands," filed on Apr. 15, 1997 for Chien-Kou TIEN, Ching-Tang CHANG and George Shiang-Jyh LAI, (3) U.S. patent application Ser. N. 08/947,717, entitled "Distributed Memory Reorder Buffer in a Superscalar Pipeline System," filed on Oct. 9, 1997 for Ruey-Liang MA, Chien-Kuo TIEN, Shiang-Jyh LAI, Dze-Chuang WANG and Shi-Sheng SHANG, and (4) U.S. patent application Ser. No. 08/972,226 entitled "Branch Prediction and Fetch Mechanism for Variable Length Instruction, Superscalar Pipelined Processor," filed on Nov. 17, 1997 for Chia-Chang HSU, Ruey-Liang MA, Chien-kuo TIEN and Kun-Cheng WU.

The above-listed patent applications are assigned to the same assignee as this application and are incorporated herein by reference.

FIELD OF THE INVENTION

The present invention pertains to processor design. In particular, the present invention pertains to a processor capable of executing instructions containing symbolic references (operands specified as symbols, rather than as "numeric references" or run-time executable functions that evaluate to specific memory locations or "slots") that are dynamically resolved to numeric references during execution.

BACKGROUND OF THE INVENTION

A pipelined processor is a processor having several sequentially connected stages or sections. For example, a processor can have an instruction cache, an instruction decoder, a register read stage, an execution stage and a post-execution register write stage. The instruction cache is a memory for storing instructions pending execution. Because of the temporal locality of reference (tendency to repeat execution of a recently executed instruction) and spatial locality of reference (tendency to execute instructions in memory locations nearby the memory locations of a recently executed instruction) properties of instruction execution, the instruction cache reduces the number of accesses to a slower main memory, thereby increasing instruction execution speed. The instruction decoder decodes the instruction into control signals for selecting/retrieving the appropriate operands and arithmetic, logic or memory access operations on such operands. The register read stage may be provided in certain processors having a register file for quickly and efficiently retrieving information contained in, or indexed by, registers of the register file. The execution stage illustratively includes one or more functional units or sections for executing the operation on the operands as specified in the decoded instruction. The post execution register write stage is for quickly and efficiently storing values in the register file. Other stages or configurations are also known in the prior art.

In addition to the above noted stages, a data cache is also often provided in the processor. Like the instruction cache, the data cache stores data, e.g., different operands, pending execution thereon. The data cache is separated from the instruction cache because the temporal and spatial locality of reference properties of operands are typically independent of those of instructions.

Figure 1:
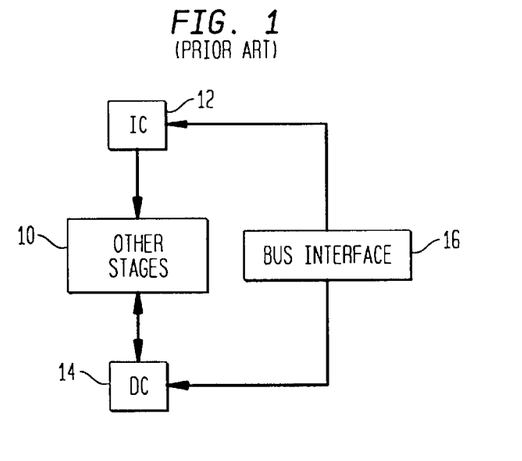
FIGS. 1–3 show conventional instruction and data cache architectures.
Figure 2:
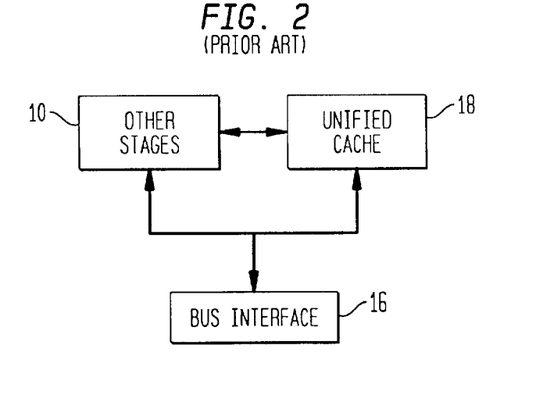
Figure 3:
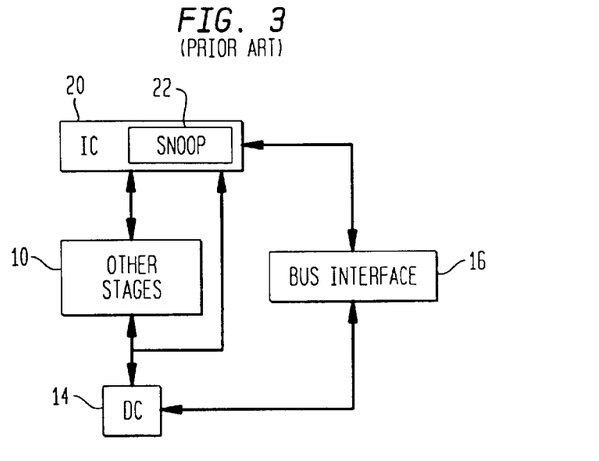

Several architectures are known for connecting the instruction and data caches to the other stages of the processor, such as shown in FIGS. 1–3. FIG. 1 shows an architecture which is similar to that employed in a processor manufactured by MIPS™. An instruction cache 12 and a separate data cache 14 feed the other stages 10 in parallel. Either cache 12 or 14 can access the bus interface 16 so as to receive information (e.g., instructions or data) from, or transmit information to, devices outside the processor, such as the processor bus, L2 cache, main memory, etc. The architecture of FIG. 1 is characterized as conserving manufacturing costs and integrated circuit chip space and also improving execution speed as a result of separating the instruction cache 12 from the data cache 14.

A shortcoming of the architecture of FIG. 1 is its inability to support instruction code self-modification. That is, instructions executing in stages 10 cannot modify instructions that reside in the instruction cache 12. The reason is as follows. Consider that both the data cache 14 and the instruction cache 12 stores facsimile copies of instructions and data of a main memory. If another device requests to access the same data or instructions for which the instruction cache 12 or data cache 14 has a copy, the instruction cache 12 or data cache 14 must relinquish control of (i.e., invalidate or erase) such instructions or data. Furthermore, if the copy of such instruction or data in the instruction cache 12 or data cache 14 has been modified since it was retrieved from the main memory, such modifications must be written back to the main memory. Since the same data or instructions may be modified repeatedly, the instruction cache 12 and data cache 14 preferably defer writing back modified instructions or data until another device requests such instructions or data; until the instruction cache 12 or data cache 14 runs out of storage space; or as a result of a specific program instruction to do so. (This manner of deferring updates of modifications to information is referred to as a "write back", policy or scheme). The problem is that all modified information, whether such modified information is program data or executable instructions, is outputted to the data cache 14. Thus, it is possible that the following scenario can occur: the instruction cache 12 writes back a copy of a to-be-modified instruction shortly after submitting the instruction that modifies it to the other stages 10 for execution. The modified instruction is written to the data cache 14. Before the data cache 14 writes back the modified instruction, the instruction cache 12 reads in the same instruction for execution. However, because the instruction cache 12 has no way of knowing that the data cache 14 possesses a modified version of the instruction (indeed the data cache 14 does not even know this), the instruction cache 12 obtains the stale unmodified copy of the instruction from the main memory. This result is a serious violation of the memory coherency restriction imposed on all caches 12 and 14 because the program would not execute as specified in the program instructions, possibly causing an unrecoverable system error or crash.

FIG. 2 shows a second architecture similar to that employed in Intel's™'486™ processor. Unlike the architecture of FIG. 1, a single unified cache 18 is provided for storing instructions and data. As a result, the performance of this processor architecture is lower than that of the processor shown in FIG. 1. Nevertheless, this architecture is inexpensive and can support self-modifying instructions.

FIG. 3 shows a third architecture similar to that employed in Intel's™ Pentium™ processor. The instruction cache 20 is modified to include a snoop circuit 22. The snoop circuit 22 keeps track of the modifications to data loaded into the data cache 14, including modifications to instructions. As such, in the above scenario, if the instruction cache 20 attempted to load a modified instruction prior to the data cache 14 writing back the modifications, the snoop circuit 22 would obtain the modified copy of the instruction from the data cache 14, not the stale copy from the main memory. Thus, the architecture of FIG. 3 has a fast execution speed and accommodates self-modifying instructions. The problem is that the complexity of the snoop circuit 22 far increases the cost of the architecture of FIG. 3. The increase in cost might not be justifiable for low cost processors used in certain applications.

Executable instructions are traditionally generated one of two ways: by compiling source code instructions or interpreting source code instructions. In compiling source code, a compiler program reads each textual source code instruction. In response to each instruction, the compiler generates one or more machine executable instructions ("object code" instructions). The source code instructions specify high-level functions applied to variables in human readable form. Source code instructions are often specified as functions performed on variables in symbolic form as it is easier for a human to distinguish variables identified by symbols rather than memory locations. For example, the source code instruction "i:=i+2;" specifies that the variable identified the symbol i is to be incremented by 2. A later instruction "i:=i/2;", specifies that the same variable identified by the symbol i should be divided by 2. The compiler not only translates each function to one or more operations to be performed on variables, but furthermore assigns memory locations or slots to each variable and replaces the symbolic reference to the variable with a "numeric reference." A numeric reference is either a memory address of the slot in which the variable is stored or a machine executable function that produces the slot. Thus, the instruction "i:=i+2;" may be translated to "LOAD R1,0×13F4; ADD R1,2;" assuming that memory location or slot with address 0×13F4 has been assigned to storing the contents of the variable identified by the symbol i. The instruction "i:=i/2;" may be translated to "LOAD R3,0×13F4; DIV R3,R3,2;". Again, the operation is performed on the slot having address 0×13F4 which the compiler assigned to the variable identified by the symbol i. The compiler may also use more sophisticated types of addressing in translating instructions to numeric references such as indirect mode addressing, indexed mode addressing, etc. These modes are predefined, executable functions for identifying the slot of a variable. For example, consider the compilation of the source code instruction "a[i]:=a[i]+2;" which increments the $i^{th}$ array element of array a by 2. This instruction may be compiled to: "LOAD R3, 0×2F36; LOAD R2, 0×13F4; LOAD R1,R2 (R3); ADDR1,R1,2;" wherein variable i is stored at the slot having address 0×13F4 and the array a is stored at sequential addressed slots beginning at the address 0×2F36. Note the numeric reference "R2(R3)" which causes the value stored at the slot having the address in register R3 to be added to value stored in the register R2 to produce a slot address operand. Source code languages that employ compilers include C, FORTRAN, PASCAL, etc.

An alternative manner for generating executable instructions is to interpret the source code instructions. An interpreter is an executable object code program that interprets each source code instruction one by one. In the course of interpreting a source code instruction, the interpreter dynamically identifies the numeric reference for each symbolic reference in each source code instruction. This is achieved by searching a "data object" which is a dynamically created mapping between symbols and the numeric references to which they correspond. The interpreter then translates the function of the source code instruction into object code instructions or operations to be performed on the identified numeric operands in place of their respective symbolic operands. The interpreter "interprets" each source code instruction, i.e., generates the object code instructions and resolves symbolic references to numeric references, each time the source code instruction is executed. Thus, if the source code instructions implement a loop, whereby a sequence of source code instructions is executed N times, then each instruction in that loop is interpreted (including resolving each symbolic reference to a numeric reference) N times.

Compiling generates many but fairly efficiently executed object code instructions. Interpretation generates no or few object code instructions but executes each source code instruction at a much slower pace. This is because each source code instruction is interpreted each time it is executed in the course of executing a source code program under an interpreter execution model. Nevertheless, the interpretation execution model is much simpler to use to develop programs. Programs are normally developed as separate modules or sequences of source code instructions. The developer may write a subset of the modules, compile them, execute them to test the modules and then modify a module or add additional modules to the source code program. Each time a module is modified or added after the source code has been compiled, it is possible (in fact likely) that the allocation of slots to variables (or even to object code instructions) will be varied when the modified or added module is compiled. A such, all modules must be re-compiled. In addition, it is more difficult to employ self-modifying instructions using a compiler execution model. It is also more complicated to use "symbolic" debugging software tools under the compiler execution model, which amongst other things, allow the programmer to execute each source code instruction one at a time and examine the values assigned to each variable as identified by its symbolic reference in the source code. Such constraints are not imposed on the interpreter execution model because slots and numeric references are dynamically generated during execution.

U.S. Pat. No. 5,367,685 proposes, an alternative model for generating and for executing executable object code instructions from source code instructions, which alternative model provides the advantages of both compiling and interpretation. According to this patent, a hybrid compiler/interpreter is provided. Prior to executing a source code program, a modified module is compiled. Like an ordinary compiler, the hybrid compiler/interpreter compiles source code instructions. However, in compiling such instructions, the hybrid compiler/interpreter does not resolve symbolic references to numeric references. Thus, the instructions compiled by the hybrid compiler/interpreter are intermediate form instructions containing symbolic references to variables. At run-time, all of the executed modules of the program are interpreted. During the interpreting phase, the hybrid compiler/interpreter performs the following steps. If the instruction contains a symbolic reference, the hybrid compiler/interpreter searches the data object for the numeric reference corresponding to the symbolic reference. Then, the hybrid compiler/interpreter overwrites the symbolic reference in the instruction with the numeric reference. The program counter is not advanced in this event, and the interpreter returns to the top of the program interpretation/execution loop with the program counter pointing to the same instruction for which the numeric reference has replaced the symbolic reference. Thus, the hybrid compiler/interpreter re-executes the instruction. Since no symbolic reference is present in the instruction, the instruction can be executed. In addition, because the numeric reference overwrites the symbolic reference, at each subsequent execution of the instruction, the data object need not be searched; rather, the instruction is executed as an ordinary numeric reference instruction.

Recently, the Java™ programming language has become widely popular. Java™ is an interpreted language which has become popular due to its cross-platform interoperability. Considering the wide deployment of Java™, it is desirable to design a processor particularly suited to executing Java™ source code quickly and efficiently. As noted above, U.S. Pat. No. 5,367,685 provides an efficient hybrid compiler/interpreter execution engine. It is desirable to provide a processor capable of functioning as the interpreter program described in this patent, i.e., capable of directly executing the intermediate form instructions, including resolving symbolic references to numeric references. The problem is that the particular implementation employed in U.S. Pat. No. 5,367,685 modifies instructions in the course of interpreting them. As noted above, in order to provide a processor which supports self-modifying instructions, a very expensive cache architecture with snoop circuit, such as is shown in FIG. 3, must be employed.

It is therefore an object of the present invention to overcome the disadvantages of the prior art.

It is a further object of the present invention to provide a, simple processor capable of executing intermediate form code and which resolves symbolic references to numeric references in the course of executing each instruction.

SUMMARY OF THE INVENTION

These and other objects are achieved according to the present invention. According to the invention, a processor is provided with a decoder, a memory connected to the decoder and an execution stage connected to the decoder. The decoder receives each instruction. Each time the decoder receives an instruction, if the instruction contains a symbolic reference, the decoder determines whether or not the symbolic reference has been resolved into a numeric operand. If the symbolic reference has been resolved into a numeric operand, the memory retrieves, from a numeric reference table, a numeric operand to which the symbolic reference has been resolved. The execution stage then executes the instruction on the retrieved numeric operand in place of the symbolic reference.

If the symbolic reference has not been resolved into a numeric operand, then the execution stage searches a data object, which relates each symbolic reference to a memory slot in which a corresponding numeric operand is stored, for a numeric reference relating the symbolic reference to a corresponding numeric operand. The memory then retrieves the numeric operand, that corresponds to the unresolved symbolic reference, from the memory slot indicated by the numeric reference of the data object. The memory stores the retrieved numeric operand in the numeric reference table maintained therein. The execution stage executes the instruction on the retrieved numeric operand in place of the symbolic reference of the instruction and indicates to the decoder that the symbolic reference is resolved (for future executions).

Thus, symbolic references are resolved dynamically to numeric operands during execution, but do not overwrite the symbolic references in the instruction to which they correspond. Instead, the numeric operands to which the symbolic references corresponds are stored in a numeric reference table. This speeds up each subsequent execution of the instruction because the symbolic reference can be quickly resolved by resort to the numeric reference table rather than requiring a search of the entire data object.

"Resolved indications," which each indicates whether or not a specific, respective symbolic reference is resolved, can be stored in a numeric reference buffer. The resolved indications of the numeric reference buffer are indexed by the fetch address of the executed instruction. The numeric reference buffer may be implemented as a mirror buffer, meaning that the same mapping/decoding of the fetch address as employed in accessing the instruction in the instruction cache is employed in accessing the appropriate resolved indication in the numeric reference buffer. Alternatively, the numeric reference buffer may be implemented as a non-mirror buffer, meaning that an independent mapping/decoding of the fetch address than that employed in accessing the instruction in the instruction cache is employed in accessing the appropriate resolved indication in the numeric reference buffer. Preferably, the numeric reference table of numeric operands is also stored in the numeric reference buffer, wherein each numeric operand is stored in relation to its respective resolved indication and accessed (indexed) the same way. In such a case, the numeric reference buffer may take the form of a cache where the resolved indication is simply the valid bit. However, the numeric table may also be stored in a different memory.

Instructions can also include numeric references. Illustratively, a second "static" numeric reference buffer stores resolved indications for such references. However, such indications always indicate that the numeric reference is resolved. Furthermore, no numeric operand need be specifically stored in the numeric reference buffer, since the numeric reference can be easily resolved to a numeric operand during execution.

Thus, the hybrid compiler/interpreter model can be implemented at the processor level. That is, a compiler program compiles source code instructions into intermediate instructions that retain symbolic references to operands/variables. The processor can execute such intermediate instructions and can resolve symbolic references into numeric operands during execution. Since the resolution does not modify instructions, a simple and inexpensive instruction and data cache architecture, which does not need complex snoop circuitry, can be used in the processor.

DETAILED DESCRIPTION OF THE INVENTION

Figure 4:
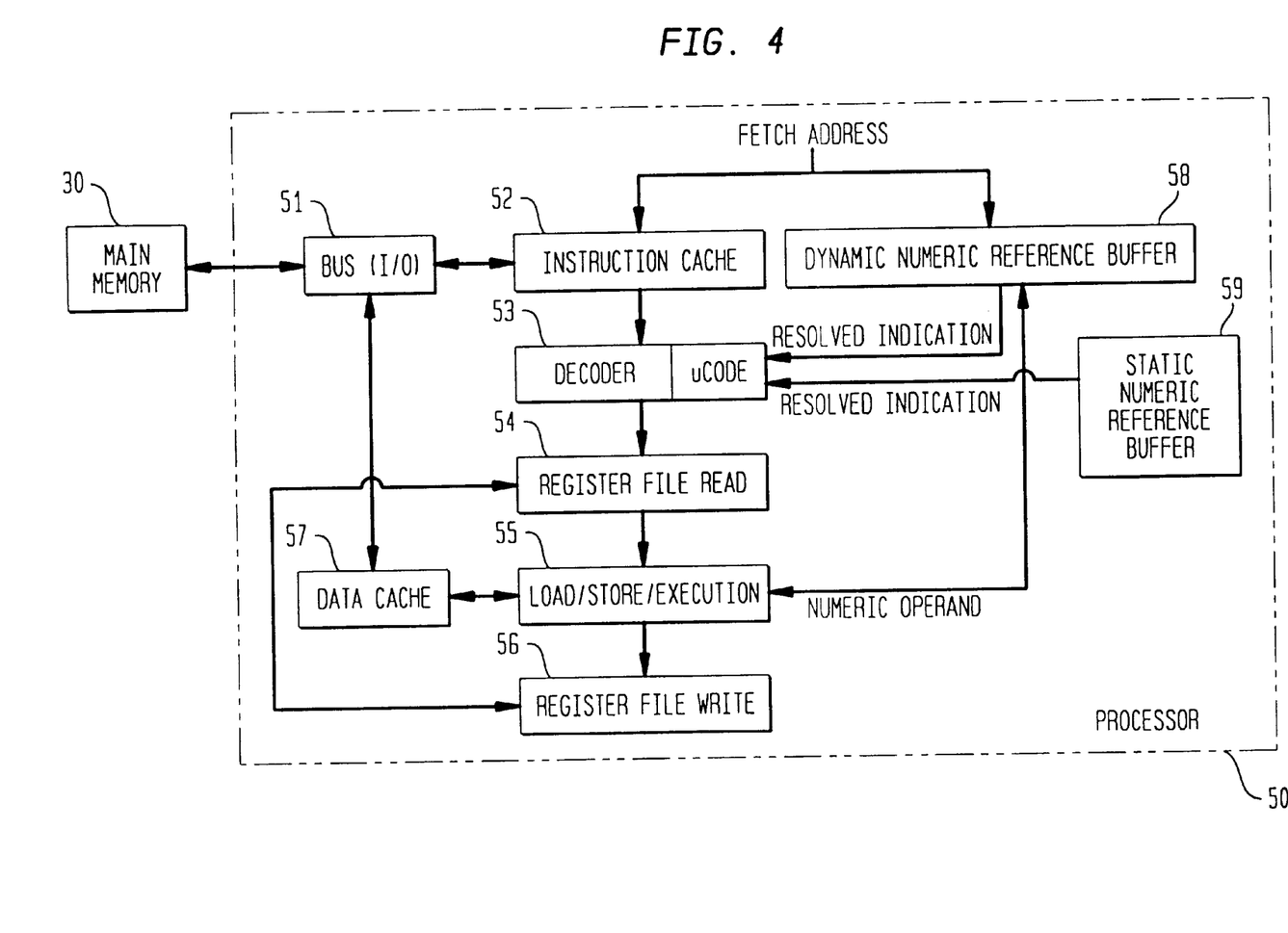
FIG. 4 shows a processor architecture according to an embodiment of the present invention.

FIG. 4 shows a processor 50 according to an embodiment of the present invention. Only the portion of the processor 50 necessary to understand the invention is shown. Other stages or parts may be present or may optionally provided.

The processor 50 has a bus I/O interface 51 that interfaces the processor 50 with an external memory such as a main memory 30, L2 cache (not shown) or other device connected to the processor 50. The bus interface 51 enables instructions to be transferred between the instruction cache 52 and the main memory 30 and enables data to be transferred between the data cache 57 and the main memory 30.

A fetch address is generated indicating the next instruction to be executed. Instructions are generally executed in sequence. However, when a branch instruction or subroutine call instruction is executed, a fetch address may be generated for executing a non-sequential instruction as specified by the branch or subroutine instruction. The fetch address is received at the instruction cache 52 which responds thereto by retrieving the instruction that begins at the fetch address. The retrieved instruction is outputted from the instruction cache 52 to the decoder 53. Preferably, instructions are outputted at a sufficiently high cyclic rate so that the decoder 53 always has an instruction available to decode as is not idle. Illustratively, the instructions outputted from the instruction cache 52 are variable length instruction words (for example, having a length of 1–12 bytes, assuming prefix codes are not counted) and fetched instructions can cross instruction cache line boundaries.

The decoder 53 decodes each instruction received from the instruction cache 52. In decoding the instructions, the decoder 53 generates the appropriate control signals for executing one or more arithmetic, logic or memory access operations for executing the function of the instruction. In addition, the decoder 53 generates signals for retrieving the operands of the instructions. This can be done one of two ways. If the operands are identified by a numeric reference, such as a slot address or an executable function (e.g., indexed address) that produces the slot address, the decoder 53 simply generates appropriate control signals for causing the register file read stage 54, the load/store/execution stage 55 and the register file write stage 56 to retrieve (and to store) the appropriate operand(s). On the other hand, the instructions may also identify one or more operands by symbolic references. In such a case, the decoder 53, in conjunction with the load/store/execution stage 55, resolves the symbolic references to numeric operands, as described below. At the circuit level, this may be achieved by receiving control signals representing a resolved indication (described below) or by generating control signals for receipt at the load/store/execution stage 55 for receiving the numeric operand. (The resolution indication and the numeric operand may be transferred from the numeric reference buffer 58.) This is described in greater detail below.

The register file read stage 54 is for reading information from specified registers for use by the load/store/execution stage 55.

The load/store/execution stage 55 receives instructions and operands from the data cache 57 or register file read stage 54. (In addition, numeric operands corresponding to symbolic operands of instructions may be received from the numeric reference buffer 58.) The load/store/execution stage 55 executes the operation(s) specified by each decoded instruction on the appropriate operands. If indicated by the instructions, the result(s) of the execution are outputted to the data cache 57 for storage at an appropriate memory location. Alternatively, if indicated by the instructions, the load/store/execution stage 55 generates appropriate control signals for storing the result(s) in a register. These signals are outputted to the register file write stage 56. For sake of brevity below, the load/store/execution stage 55 is referred to simply as the "execution stage" 55. Those having ordinary skill in the art may appreciate that the execution stage 55 may be comprised of multiple functional units including one or more logic units, floating point units, integer units, load units and store units.

The data cache 57 is for storing data pending use by the execution unit 55. The register file write stage 56 is for writing results into registers of the register file as indicated by control signals received from the execution stage 55.

Preferably, the processor 50 has a ("dynamic") numeric reference buffer 58. The numeric reference buffer 58 is for storing at least resolved indications (flags), where each resolved indication indicates whether or not a specific, respective symbolic reference has been resolved to a numeric operand. The numeric reference buffer 58 may also store a numeric reference table containing numeric operands, to which respective symbolic references have been resolved. Illustratively, the numeric reference buffer 58 receives the fetch address of the next fetched instruction. This fetch address is used to index the resolved indications (and the numeric reference table, if present) for retrieving the indexed resolved indication, if present (and the indexed numeric operand). The indexed resolved indication, if present, is outputted to the decoder 53 (and the indexed numeric operand, if present, is outputted to the execution stage 55). In addition, as a result of execution, a resolved indication (and numeric operand) may be outputted from the execution stage 55 for storage at a respective indexed address.

Also shown is an optional "static" numeric reference buffer 59. As described in greater detail below, the static numeric reference buffer 59 is for storing resolved indications for numeric references of decoded instructions.

Figure 5:
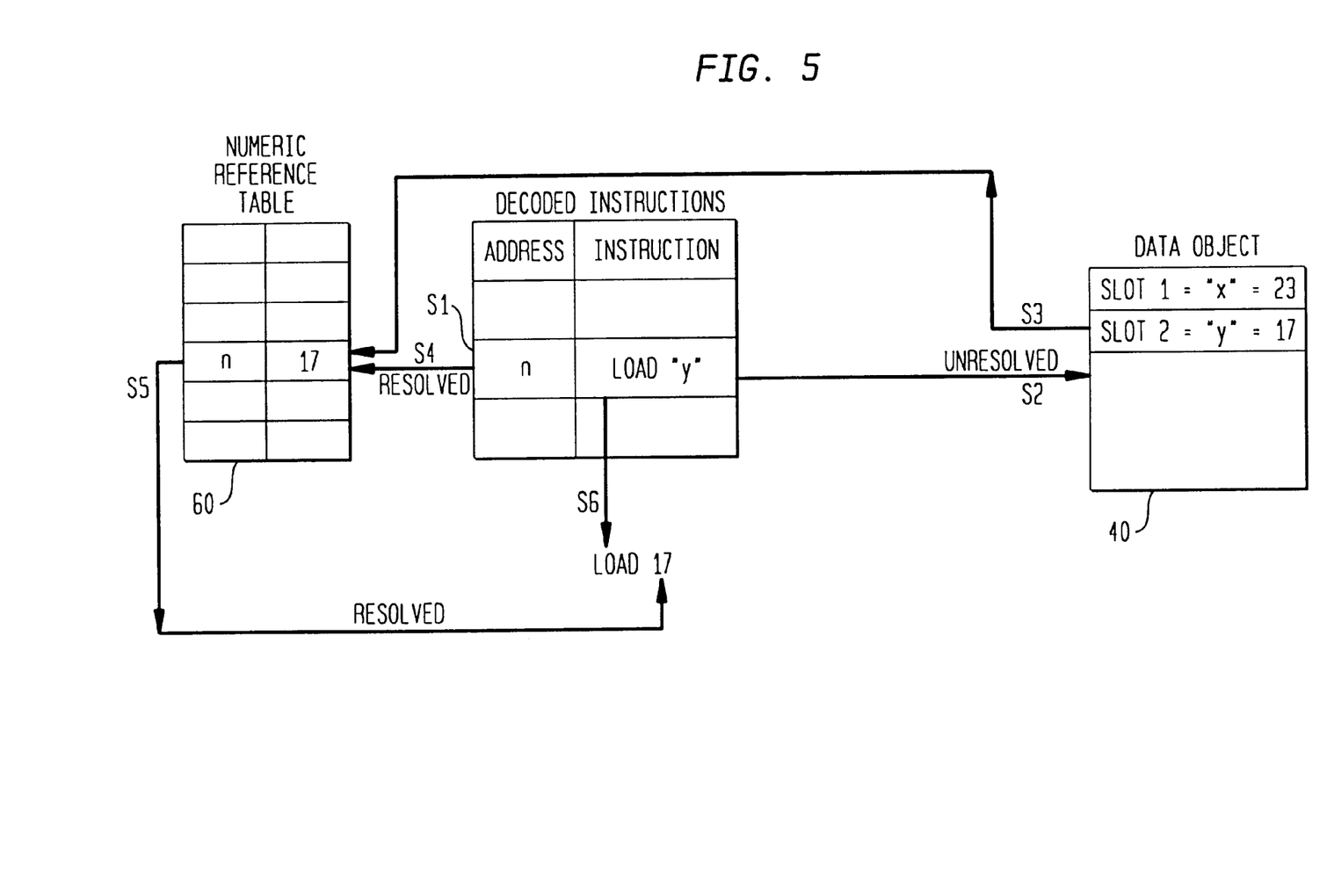
FIG. 5 shows an illustration of symbolic reference to numeric operand resolution according to an embodiment of the present invention.

Referring now to FIG. 5 in conjunction with FIG. 4, an overview of one embodiment of the invention is described. First, source code instructions are compiled using a compiler program into intermediate instructions. The intermediate instructions contain unresolved symbolic references. Next, the intermediate instructions are directly executed by the processor 50. When an instruction is decoded (step S1), the decoder 53 determines whether or not the instruction contains an unresolved symbolic reference (as described below). Assume initially, that the symbolic reference "y" of decoded instruction LOAD "y" is unresolved. In such a case, the decoder 53 outputs instructions to the execution stage 55 for resolving the symbolic reference "y" to a numeric operand (step S2). In response, the execution unit 55 searches the data object 40 for a numeric reference that maps the unresolved symbolic reference "y" to a numeric operand. In this case, the numeric operand "17" is stored in slot 2. The numeric operand "17" thus identified is then retrieved and stored in a numeric reference table 60 (step S3). (The identification and retrieval of the numeric operand from the data object may be performed in a similar fashion as with an interpreter program and therefore is not described herein.)

The execution stage 55 can then execute the decoded operation on the numeric operand 17 in place of the symbolic reference y (step S6).

On the next execution of the same decoded instruction, the decoder 53 will determine that the symbolic reference y has been resolved (step S4). As such, the numeric operand 17 is immediately retrieved from the numeric reference table 60 (step S5) and the decoded instruction is directly executed on the retrieved numeric operand 17 in place of the symbolic reference y (step S6).

Note that the original instruction LOAD "y" is not modified. Instead, the numeric operand is substituted for the symbolic reference. Thus, each time the instruction is executed, the decoder 53 must perform a separate check to determine whether or not the symbolic reference(s) therein are resolved. For sake of execution optimization, this is achieved by assigning and retaining a "resolved indication" for each symbolic reference. After each symbolic reference is resolved, a resolved indication therefor is stored indicating that the symbolic reference is resolved. Thus, when subsequently executing the same instruction, the resolved indication therefor is retrieved, if any is present. In this case, the resolved indication could be retrieved and would indicate that the symbolic reference is resolved thereby indicating that the numeric operand could be quickly retrieved from the numeric reference table 60. This is so because the numeric reference table 60 advantageously is indexed by the fetch address of the instruction containing the resolved symbolic reference.

Figure 6:
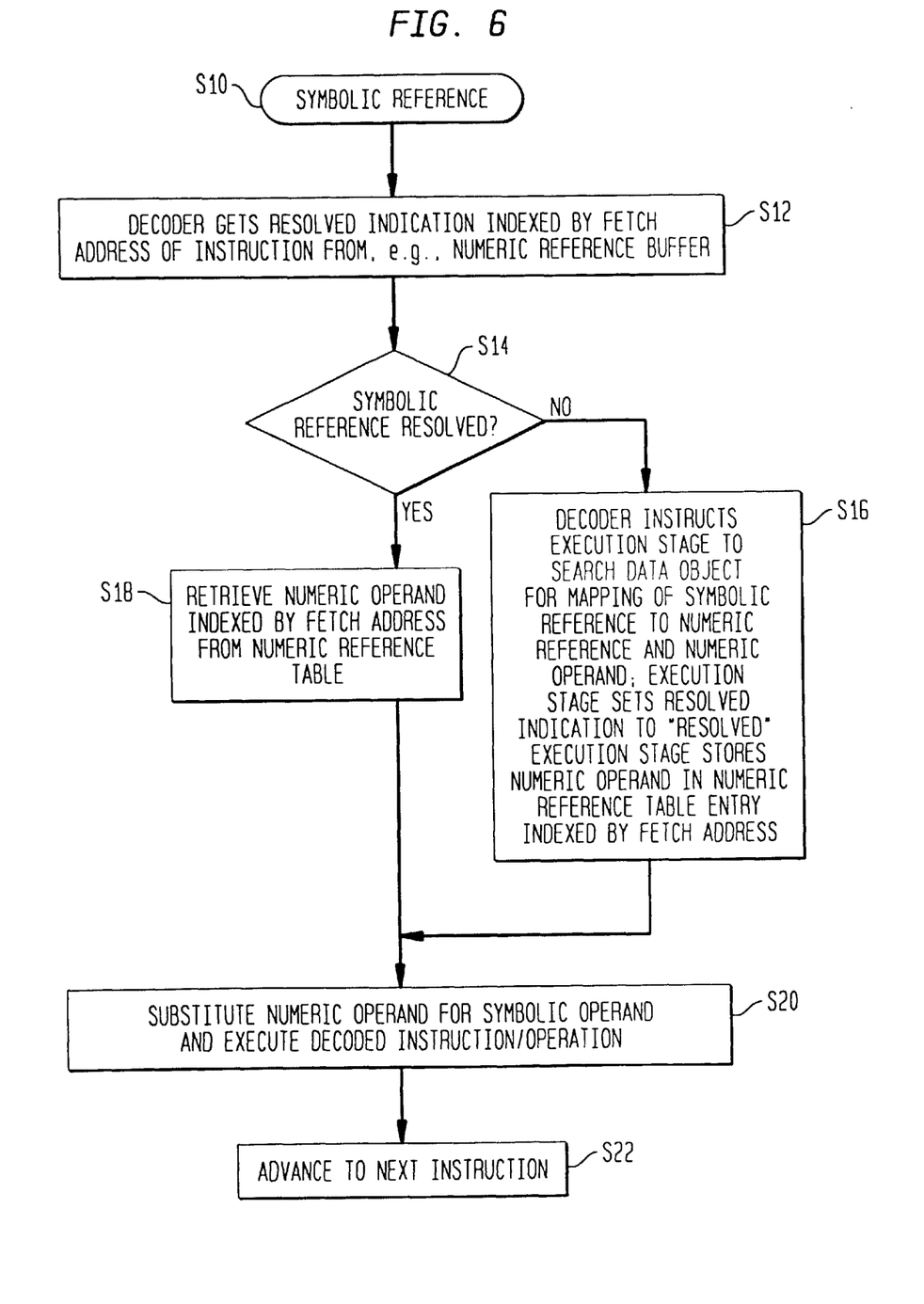
FIG. 6 shows a flow chart for executing instructions containing symbolic references according to an embodiment of the present invention.

FIG. 6 shows a flow chart of a symbolic reference resolution procedure according to the present invention. Step S10 is executed each time the decoder 53 decodes an intermediate instruction containing a symbolic reference. In step S12, the decoder 53 attempts to obtain the resolved indication indexed by the fetch address of the instruction with the symbolic reference. Advantageously, the resolved indication is obtained from a numeric reference buffer 58 in the processor 50. In step S14, the decoder 53 determines whether or not the retrieved resolved indication (if any) indicates that the symbolic reference is resolved. If not, step S 16 is executed. In step S16, the decoder 53 instructs the execution stage 55 to search the data object 40 for the mapping of the symbolic reference to the numeric reference and numeric operand. When located, the execution stage 55 stores a resolved indication indicating that for the symbolic reference is resolved in a storage location of the numeric reference buffer 58 indexed by the fetch address of the instruction. The execution stage 55 also stores the numeric operand in an entry of the numeric reference table 60 indexed by the fetch address of the instruction.

On the other hand, if in step S14, the decoder 53 determines that the symbolic reference is resolved, the execution stage 55 obtains the numeric operand indexed by the fetch address of the instruction from the numeric reference table 60. Preferably, the numeric reference table 60 is maintained in the numeric reference buffer 58. However, the numeric reference table 60 may also be maintained in the memory 30 (or data cache 57).

Next (either from step S16 or from step S18) in step S20, the execution stage 55 substitutes the numeric operand for the symbolic reference in the decoded instruction or operation. The execution stage 55 then executes the decoded instruction or operation on the numeric operand.

As noted above, the resolved indications preferably are stored in a numeric reference buffer 58 internal to the processor 50. The numeric reference buffer 58 may be implemented using one of two architectures, referred to as a "mirror" architecture and a "non-mirror" architecture. The mirror architecture numeric reference buffer 58 is so called because the mapping between the fetch addresses and the storage locations for each resolved indication (of the respective symbolic references contained with in the instructions that begin at the corresponding fetch addresses) is identical to or "mirrors" the mapping between fetch addresses and the instruction cache 52 cache line storage locations for instructions. Stated another way, the very same decoding technique employed on a fetch address in the instruction cache 52 for selecting a cache line storage location containing the next instruction to be decoded, can be used for selecting the storage location containing the resolved. indication of a symbolic reference contained in that instruction. As a result, at least some of the decoding logic can be shared between the instruction cache 52 and numeric reference buffer 58, thereby reducing the overall processor chip space requirements and cost.

Figure 7:
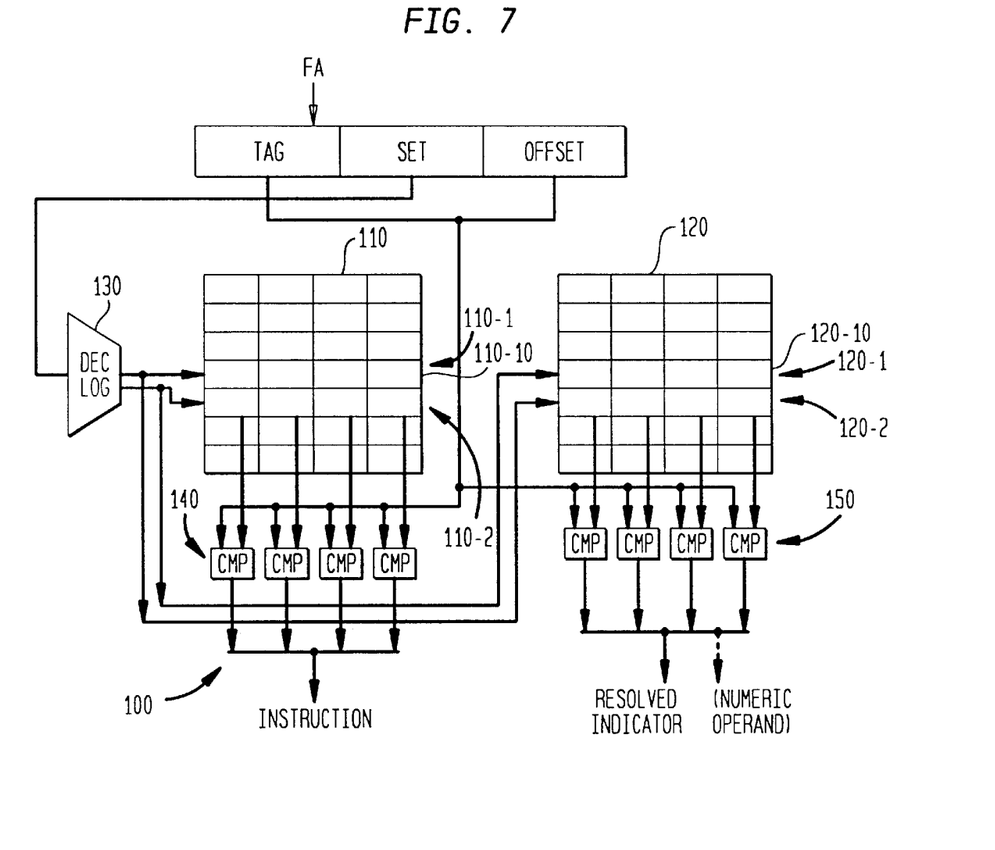
FIG. 7 shows a mirror numeric reference buffer according to an embodiment of the present invention.

FIG. 7 illustrates an instruction cache 52 and mirror numeric reference buffer 58 combined into a circuit 100. Only a portion of the instruction cache 52 and mirror numeric reference buffer 58 are shown. For example, miss detection logic, and logic for storing instructions and resolved indications are not shown. However, these circuits are well known in the art and need not be described further, except to mention that separate miss detection and storage logic is preferably used in the instruction cache 52 and numeric reference buffer 58.

A circuit 100 includes an instruction cache memory array 110 and a numeric reference buffer array 120. Both arrays 110, 120 use the same mapping technique, which in this case is a 4-way set associative technique. This means, that a given "set" portion of the fetch address identifies a cache line 110-1 or lines 110-1 and 110-2 in a particular row or rows of the array 110 and a resolved indication line 120-1 or lines 120-1 and 120-2 in the same relative particular row of the array 120. In the circuit of FIG. 7, each fetch address can be viewed as formed by a tag portion, a set portion and an offset portion. All fetch addresses with the same sequence of set bits are in the same set. All instructions or resolved indications of the same set are stored in a storage location, e.g., 110-10 or 120-10, of the same row, e.g., 110-1 or 120-1, of the array 110 or 120. Thus, the same array row select line or lines activated by the decoder logic 130 can be fed directly to both arrays 110 and 120.

As is known with set associative cache architectures, more than one address will map to the same cache line row. Thus, in addition to storing the data of a cache line, each storage location, e.g., 110-10 also stores a tag portion and an offset portion of the address of the instruction or resolved indication stored therein. When accessing a particular cache line row 110-1 or 120-1, the offset and tag portions of the fetch address are compared to the offset and tag portions stored in each storage location, e.g., storage location 110-10 of the array 110 or storage location 120-10 in the array 120, in comparators 140 or 150. If the offset and tag of the inputted fetch address match the offset and tag stored in the cache storage location 110-10 or 120-10, then the stored information in the array storage location 110-10 or 120-10 corresponds to the fetch address and is outputted. If the offset and tag stored in the array storage location 110-10 or 120-10 do not correspond to the offset and tag of the fetch address, then the information stored in the array storage location 110-10 or 120-10 does not correspond to the inputted fetch address and is not outputted. A 4-way set associative cache can store information for up to four different fetch addresses of the same set (but having different offsets and tags).

If none of the comparators 140 receives an offset and tag that match the fetch address offset and tag, a cache "miss" occurs and logic (not shown) retrieves the instruction from the main memory. If none of the comparators 150 receives an offset and tag that match the fetch address offset and tag, no information is retrieved. Rather, a "miss" in the numeric reference buffer array 120 preferably is treated the same way as retrieving a resolved indication which indicates that the respective symbolic reference is unresolved.

Each storage location of the arrays 110 and 120 also have a valid/invalid bit indicating whether or not the corresponding instruction or resolved indication stored therein is valid or invalid. The comparators 140 or 150 receiving invalid bits are prevented from outputting the instruction or resolved indication stored therein whether or not the tag and offset stored therein match the fetch address tag and offset. Alternatively, the valid/invalid bit is the same as the resolved indication in array 150. In such a case, the value of the valid/invalid-resolved indication is outputted regardless of whether this bit/indication indicates valid or invalid so long as the tag and offset corresponding thereto match the tag and offset of the fetch address.

In the case that a non-mirror numeric reference buffer 58 is used, then the numeric reference buffer 58 can also take the form of a cache. However, the numeric reference buffer 58 would have separate decoding logic. A separate numeric reference buffer is desirable if different hit/miss ratios are expected in the instruction cache and numeric reference buffer thereby warranting different cache architectures, e.g., 4-way set associative for the instruction cache 52 and 2-way set associative for the numeric reference buffer 58.

The numeric reference buffer array 120 preferably stores the numeric reference table 60 as well as the resolved indications. This is because, there is a resolved indication corresponding to each numeric operand. As noted above, the resolved indication can simply be the valid/invalid bit associated with each array storage location of the numeric reference buffer 58, and the numeric operand can be stored in the array storage location. Thus, both the resolved indication and numeric operand can be retrieved in parallel and at high speed. In this case, a numeric operand is outputted only when the bit/indication indicates valid/resolved. When the bit/indication indicates invalid/unresolved only the bit/indication is outputted.

As noted above, if the numeric reference table 60 of operands is stored in a memory outside of the processor 50, then the execution stage 55 must retrieve the numeric operand from an outside memory (via the data cache 57). The presence of the data cache ensures that frequently accessed data, including frequently accessed portions of the numeric reference table 60 nevertheless are likely to be present in the processor 50.

Note, that there are in fact four possible numeric reference buffer 58 architectures:
(1) mirror numeric reference buffer storing only resolved indications with the numeric reference table of operands being stored in an external memory;
(2) non-mirror numeric reference buffer storing only resolved indications with the numeric reference table of operands being stored in an external memory;
(3) mirror numeric reference buffer storing both resolved indications and the numeric reference table of operands; and
(4) non-mirror numeric reference buffer storing both resolved indications and the numeric reference table of operands.

In certain architectures, it might be desirable to provide resolved indications for both symbolic references and numeric references of instructions. The reason why is that the decoder 53 can be simplified if it need not have logic for accommodating two different scenarios, namely, retrieving resolved indications for symbolic references but not numeric references. Of course, a numeric reference can be resolved without resort to the data object. Therefore, the resolved indications for numeric references should always indicate that the numeric reference is resolved. A separate numeric reference buffer for numeric references of instructions may be provided. Herein, the numeric reference buffer 59 that stores resolved indications for numeric references contained in instructions is referred to as the "static numeric reference buffer," and the numeric reference buffer 58 (described at length above) for storing resolved indications (and possibly also numeric operands) for symbolic references is referred to as the "dynamic numeric reference buffer." The static numeric reference buffer 59 can also have either a mirror or a non-mirror architecture in regard to how the static numeric reference buffer 59 decodes the fetch address in comparison to the instruction cache 53. Thus, there are four possibilities of static and numeric reference buffers 59, 58:
(1) mirror dynamic numeric reference buffer 58 and mirror static numeric reference buffer 59;
(2) mirror dynamic numeric reference buffer 58 and non-mirror static numeric reference buffer 59;
(3) non-mirror dynamic numeric reference buffer 58 and mirror static numeric reference buffer 59; and
(4) non-mirror dynamic numeric reference buffer 58 and non-mirror static numeric reference buffer 59.

An advantage to having the same type of dynamic numeric reference buffer 58 and static numeric reference buffer 59 is that it is possible to combine the two buffers 58 and 59 so as to share at least some decoding logic between the two numeric reference buffers 58 and 59. The dynamic numeric reference buffer 58 would then mirror the static numeric reference buffer 59 (whether or not the static and dynamic numeric reference buffers 58 and 59 also mirrored the instruction cache 52). Preferably, both a static numeric reference buffer 59 and dynamic numeric reference buffer 58 are provided in the processor 50 and the dynamic numeric reference buffer 58 stores both the resolved flag and the numeric reference table.

The above discussion is intended to be merely illustrative of the invention. Those having ordinary skill in the art may devise numerous alternative embodiments without departing from the spirit and scope of the following claims.

We claimed:

1. A method for executing instructions containing symbolic references comprising the steps of:
    each time an instruction is executed;
    (a) if said instruction contains a symbolic reference, determining whether or not said symbolic reference has been resolved into a numeric operand, and retrieving a resolved indication from a numeric reference buffer indicating whether or not said symbolic reference has been resolved to a numeric operand,
    (b) if said symbolic reference has been resolved into a numeric operand:
        (b1) retrieving from a numeric reference table said numeric operand to which said symbolic reference has been resolved, and
        (b2) executing said instruction on said retrieved numeric operand in place of said symbolic reference.

2. The method of claim 1 wherein said step (b2) further comprises the step of retrieving said numeric operand from an entry of said numeric reference table indexed by an address of said instruction.

3. The method of claim 1 further comprising the steps of:
(c) if said symbolic reference has not been resolved into a numeric operand then
  (c1) searching a data object, which relates each symbolic reference to a memory slot in which a corresponding numeric operand is stored, for a numeric reference relating said symbolic reference to a corresponding numeric operand,
  (c2) retrieving said numeric operand that corresponds to said unresolved symbolic reference from said memory slot indicated by said numeric reference of said data object and storing said retrieved numeric operand in said numeric reference table,
  (c3) indicating that said symbolic reference is resolved, and
  (c4) executing said instruction on said retrieved numeric operand in place of said symbolic reference of said instruction.

4. The method of claim 1 wherein said instruction is retrieved from an instruction cache having a memory array, and wherein a mirror numeric reference buffer is provided having locations for storing resolved indications, each indication corresponding to a specific symbolic reference and indicating whether or not said corresponding symbolic reference has been resolved to a numeric operand, said method comprising the steps of:
  (c) generating a fetch address of said instruction,
  (d) decoding said fetch address into a decoded fetch address,
  (e) retrieving said instruction from locations of said memory array of said instruction cache beginning at a particular memory array location pointed to by said decoded fetch address, and
  (f) wherein said step (a) further comprises retrieving, from a storage location of said numeric reference buffer pointed to by said decoded fetch address, a resolved indication for said symbolic reference, if present.

5. The method of claim 4 wherein said numeric reference table is stored in a memory array of said numeric reference buffer, said step (b1) further comprising the step of:
  (g) only if said retrieved resolved indication indicates that said symbolic reference is resolved, retrieving said numeric reference from a particular location of said memory array of said numeric reference buffer pointed to by said decoded fetch address.

6. The method of claim 4 wherein said numeric reference table is stored in a memory other than said numeric reference buffer.

7. The method of claim 4 wherein at least one executed instruction comprises a numeric reference operand and wherein a mirror static numeric reference buffer is provided which stores a second set of indications in respective memory locations thereof, each of said indications of said second set indicating that a corresponding numeric reference operand is resolved, said method further comprising the steps of:
  (g) if said instruction contains a numeric reference operand then retrieving an indication of said second set corresponding to said numeric reference operand, if present, from a location of said mirror static numeric reference buffer pointed to by said decoded fetch address.

8. The method of claim 4 wherein at least one executed instruction comprises a numeric reference operand and wherein a non-mirror static numeric reference buffer is provided which stores a second set of indications in respective memory locations thereof, each of said indications of said second set indicating that a corresponding numeric reference operand is resolved, said method further comprising the steps of:
  (g) decoding said fetch address to produce a second decoded fetch address, and
  (h) if said instruction contains a numeric reference operand then retrieving an indication of said second set corresponding to said numeric reference operand, if present, from a location of said non-mirror static numeric reference buffer pointed to by said second decoded fetch address.

9. The method of claim 1 wherein said instruction is retrieved from an instruction cache having a memory array, and wherein a non-mirror numeric reference buffer is provided having locations for storing resolved indications, each indication corresponding to a specific symbolic reference and indicating whether or not said corresponding symbolic reference has been resolved to a numeric reference, said method comprising the steps of:
  (c) generating a fetch address of said instruction,
  (d) decoding said fetch address into a first decoded fetch address,
  (e) retrieving, said instruction from locations of a memory array of said instruction cache beginning at a particular memory array location pointed to by said first decoded fetch address instruction,
  (f) decoding said fetch address into a second decoded fetch address, and
  (g) wherein said step (a) further comprises retrieving, from a storage location of said numeric reference buffer pointed to by said second decoded fetch address instruction, a resolved indication for said symbolic reference, if present.

10. The method of claim 9 wherein said numeric reference table is stored in a memory array of said numeric reference buffer, said step (b1) further comprising the step of:
  (h) only if said retrieved resolved indication indicates that said symbolic reference is resolved, retrieving said numeric reference from a particular location of said memory array of said numeric reference buffer pointed to by said second decoded fetch address.

11. The method of claim 9 wherein said numeric reference table is stored in a memory other than said numeric reference buffer.

12. The method of claim 9 wherein at least one executed instruction comprises a numeric reference operand and wherein a mirror static numeric reference buffer is provided which stores a second set of indications in respective memory locations thereof, each of said indications of said second set indicating that a corresponding numeric reference operand is resolved, said method further comprising the steps of:
  (g) if said instruction contains a numeric reference operand then retrieving an indication of said second set corresponding to said numeric reference operand, if present, from a location of said mirror static numeric reference buffer pointed to by said first decoded fetch address.

13. The method of claim 9 wherein at least one executed instruction comprises a numeric reference operand and wherein a non-mirror static numeric reference buffer is provided which stores a second set of indications in respective memory locations thereof, each of said indications of said second set indicating that a corresponding numeric reference operand is resolved, said method further comprising the steps of:

(g) decoding said fetch address to produce a third decoded fetch address, (h) if said instruction contains a numeric reference operand then retrieving an indication of said second set corresponding to said numeric reference operand, if present, from a location of said non-mirror static numeric reference buffer pointed to by said third decoded fetch address.

14. An processor for executing instructions containing symbolic references comprising:

a decoder receiving an instruction, and each time said instruction is received, if said instruction contains a symbolic reference, for determining whether or not said symbolic reference has been resolved into a numeric operand, a memory connected to said decoder for, if said symbolic reference has been resolved into a numeric operand, retrieving from a numeric reference table stored therein a numeric operand to which said symbolic reference has been resolved, wherein said memory retrieves a resolved indication from a numeric reference buffer indicating whether or not said symbolic reference has been resolved to a numeric operand, and an execution stage for executing said instruction on said retrieved numeric operand in place of said symbolic reference.

15. The processor of claim 14 wherein said memory retrieves said numeric operand from an entry of said numeric reference table indexed by an address of said instruction.

16. The processor of claim 14 wherein if said symbolic reference has not been resolved into a numeric operand then said execution stage searches a data object, which relates each symbolic reference to a memory slot in which a corresponding numeric operand is stored, for a numeric reference relating said symbolic reference to a corresponding numeric operand, said memory retrieves said numeric operand that corresponds to said unresolved symbolic reference from said memory slot indicated by said numeric reference of said data object and stores said retrieved numeric operand in said numeric reference table maintained in said memory, and said execution stage indicates to said decoder that said symbolic reference is resolved, and executes said instruction on said retrieved numeric operand in place of said symbolic reference of said instruction.

17. The processor of claim 14 further comprising:

a decoder for decoding a fetch address generated for said instruction into a decoded fetch address, an instruction cache having a memory array for retrieving said instruction from locations of said memory array beginning at a particular cache memory array location pointed to by said decoded fetch address instruction, and a numeric reference buffer having storage locations for retrieving, from a storage location of said numeric reference buffer pointed to by said decoded fetch address instruction, a resolved indication for said symbolic reference, if present.

18. The processor of claim 17 wherein said numeric reference buffer comprises a memory array for storing said numeric reference table and for retrieving said numeric operand from a particular location of said memory array of said numeric reference buffer pointed to by said decoded fetch address, but only if said retrieved resolved indication indicates that said symbolic reference is resolved.

19. The processor of claim 17 wherein said numeric reference table is stored in a memory other than said numeric reference buffer.

20. The processor of claim 17 wherein at least one executed instruction comprises a numeric reference operand, said processor further comprising:

a mirror static numeric reference buffer for storing a second set of indications in respective memory locations thereof, each of said indications of said second set indicating that a corresponding numeric reference operand is resolved, and if said instruction contains a numeric reference operand for retrieving an indication of said second set corresponding to said numeric reference operand, if present, from a location of said static numeric reference buffer pointed to by said decoded fetch address.

21. The processor of claim 17 wherein at least one executed instruction comprises a numeric reference operand said processor comprising:

a second decoder for decoding said fetch address to produce a second decoded fetch address, a non-mirror static numeric reference buffer for storing a second set of indications in respective memory locations thereof, each of said indications of said second set indicating that a corresponding numeric reference operand is resolved, and if said instruction contains a numeric reference operand, for retrieving an indication of said second set corresponding to said numeric reference operand, if present, from a location of said static numeric reference buffer pointed to by said second decoded fetch address.

22. The processor of claim 14 further comprising:

a first decoder for decoding said fetch address into a first decoded fetch address, an instruction cache having a memory array for retrieving said instruction from locations of said instruction cache memory array beginning at a particular memory array location pointed to by said first decoded fetch address, a second decoder for decoding said fetch address into a second decoded fetch address, and a non-mirror numeric reference buffer having storage locations for storing resolved indications, each indication corresponding to a specific symbolic reference and indicating whether or not said corresponding symbolic reference has been resolved to a numeric, operand for retrieving, from a storage location of said numeric reference buffer pointed to by said second decoded fetch address, a resolved indication for said symbolic reference, if present.

23. The processor of claim 22 wherein said numeric reference buffer comprises a memory array for storing said numeric reference table and for retrieving said numeric from a particular location of said memory array of said numeric reference buffer pointed to by said second decoded fetch address, but only if said retrieved resolved indication indicates that said symbolic reference is resolved.

24. The processor of claim 22 wherein said numeric reference table is stored in a memory other than said numeric reference buffer.

25. The processor of claim 22 wherein at least one executed instruction comprises a numeric reference operand, said processor further comprising a mirror static numeric reference buffer having memory locations for storing a second set of indications in respective memory locations thereof, each of said indications of said second set indicating that a corresponding numeric reference operand is resolved, and if said instruction contains a numeric reference operand, for retrieving an indication of said second set corresponding to said numeric reference operand, if present, from a location of said static numeric reference buffer pointed to by said first decoded fetch address.

26. The processor of claim 22 wherein at least one executed instruction comprises a numeric reference operand, said processor further comprising:

a third decoder for decoding said fetch address to produce a third decoded fetch address, a non-mirror static numeric reference buffer having memory locations for storing a second set of indications in respective memory locations thereof, each of said indications of said second set indicating that a corresponding numeric reference operand is resolved, and, if said instruction contains a numeric reference operand, for retrieving an indication of said second set corresponding to said numeric reference operand, if present, from a location of said static numeric reference buffer pointed to by said third decoded fetch address.

* * * * *